US009095982B2

(12) United States Patent
Oka et al.

(10) Patent No.: US 9,095,982 B2
(45) Date of Patent: Aug. 4, 2015

(54) DRIVE APPARATUS AND ROBOT

(75) Inventors: Takenori Oka, Fukuoka (JP); Masato Itou, Fukuoka (JP); Yusuke Kinoshita, Fukuoka (JP); Manabu Okahisa, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 702 days.

(21) Appl. No.: 13/405,359

(22) Filed: Feb. 27, 2012

(65) Prior Publication Data

US 2012/0266720 A1    Oct. 25, 2012

(30) Foreign Application Priority Data

Apr. 19, 2011  (JP) ................................. 2011-092847

(51) Int. Cl.
| H02K 7/14 | (2006.01) |
| H02P 5/00 | (2006.01) |
| B25J 17/00 | (2006.01) |
| B25J 17/02 | (2006.01) |

(52) U.S. Cl.
CPC ........ B25J 17/0283 (2013.01); *Y10T 74/19079* (2015.01); *Y10T 74/19107* (2015.01); *Y10T 74/20335* (2015.01)

(58) Field of Classification Search
CPC ...... B25J 17/0283; H02P 5/695; H02P 5/753; H02P 29/0016
USPC .............. 318/3, 8; 74/490.01, 490.03, 490.06
See application file for complete search history.

(56) References Cited

U.S. PATENT DOCUMENTS

| 4,972,735 A | 11/1990 | Torii et al. |
| 5,293,107 A | 3/1994 | Akeel |
| 5,894,761 A | 4/1999 | Danielsson et al. |
| 5,924,330 A | 7/1999 | Danielsson et al. |
| 6,318,197 B1 * | 11/2001 | Chen ............................... 74/333 |
| 8,393,243 B2 * | 3/2013 | Ono ........................... 74/490.03 |
| 2008/0034920 A1 | 2/2008 | Inoue et al. |
| 2010/0236351 A1 * | 9/2010 | Ono ........................... 74/490.01 |

FOREIGN PATENT DOCUMENTS

| EP | 0443576 B1 | 8/1991 |
| EP | 0855252 | 7/1998 |
| JP | 05-116084 | 5/1993 |
| JP | 09-53702 | 2/1997 |
| JP | 10-006270 | 1/1998 |
| JP | 10-512814 | 12/1998 |
| JP | 2004-266980 | 9/2004 |
| JP | 4233578 B2 | 2/2008 |

(Continued)

OTHER PUBLICATIONS

Extended European Search Report for corresponding EP Application No. 12156818.2-2316, Aug. 24, 2012.
Japanese Office Action for corresponding JP Application No. 2011-092837, Apr. 16, 2013.

(Continued)

*Primary Examiner* — Eduardo Colon Santana
*Assistant Examiner* — Gabriel Agared
(74) *Attorney, Agent, or Firm* — Mori & Ward, LLP

(57) ABSTRACT

This drive apparatus includes a first rotation mechanism portion including a first driven gear portion rotated by a first drive gear portion rotating about a first axis and a second rotation mechanism portion including a second driven gear portion rotated by a second drive gear portion rotating about the first axis.

17 Claims, 7 Drawing Sheets

(56) References Cited

FOREIGN PATENT DOCUMENTS

| | | |
|---|---|---|
| JP | 2008-055565 | 3/2008 |
| JP | 2010-253168 | 11/2010 |
| WO | WO 2010/008096 | 1/2010 |

OTHER PUBLICATIONS

Japanese Office Action for corresponding JP Application No. 2011-092847, Apr. 16, 2013.
Chinese Office Action for corresponding CN Application No. 201210048524.9, Aug. 5, 2014.

* cited by examiner

DRIVE APPARATUS AND ROBOT

CROSS-REFERENCE TO RELATED APPLICATIONS

The priority application number JP2011-092847, Drive Mechanism and Robot, Apr. 19, 2011, Takenori Oka, Masato Itou, Yusuke Kinoshita, Manabu Okahisa, upon which this patent application is based is hereby incorporated by reference.

FIELD

The present invention relates to a drive apparatus and a robot.

BACKGROUND

A drive mechanism including a rotation mechanism portion is known in general, as disclosed in National Patent Publication Gazette No. 10-512814 (1998), for example.

SUMMARY

A drive apparatus according to a first aspect of the disclosure includes a first rotation mechanism portion including a first drive gear portion rotating about a first axis and a first driven gear portion rotated about a second axis by the first drive gear portion and a second rotation mechanism portion including a second drive gear portion rotating about the first axis, arranged inside or outside the first drive gear portion and a second driven gear portion meshing with the second drive gear portion, rotated about the second axis by the second drive gear portion, arranged inside or outside the first driven gear portion.

A robot according to a second aspect of the disclosure includes an arm and a joint provided on one end portion of the arm, while the joint has a first rotation mechanism portion including a first drive gear portion rotating about a first axis and a first driven gear portion rotated about a second axis by the first drive gear portion and a second rotation mechanism portion including a second drive gear portion rotating about the first axis, arranged inside or outside the first drive gear portion and a second driven gear portion meshing with the second drive gear portion, rotated about the second axis by the second drive gear portion, arranged inside or outside the first driven gear portion.

DESCRIPTION OF EMBODIMENTS

Embodiments are now described with reference to the drawings.

First Embodiment

First, the structure of a robot 1 according to a first embodiment is described with reference to FIG. 1.

Figure 1:
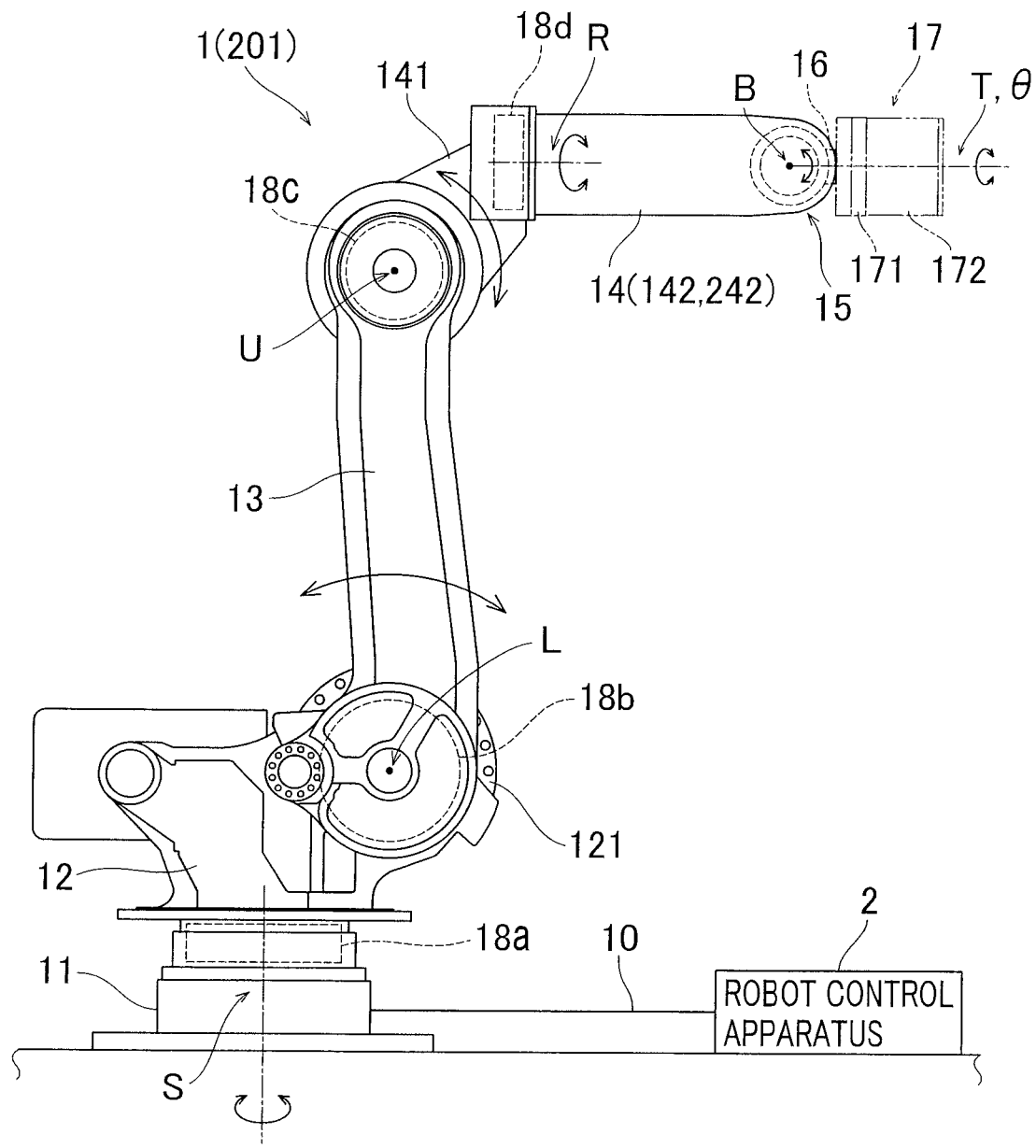
FIG. 1 is a schematic diagram for illustrating the overall structure of a robot according to each of first and second embodiments.

The robot 1 according to the first embodiment is a six-axis (S-axis, L-axis, U-axis, R-axis, B-axis, and T-axis) vertical articulated robot, as shown in FIG. 1. The robot 1 includes a turn base 11, an arm support portion 12, a lower arm 13, an upper arm 14, a wrist joint 15, an arm end 16, and a hand 17. The hand 17 is an example of the "end effector". The arm support portion 12 is an example of the "support member".

The lower surface of the turn base 11 is fixed to a mounting surface (floor surface, wall surface, ceiling surface, mounting surface of a traveling carriage, etc.), and the turn base 11 supports the arm support portion 12 on the upper surface side so as to allow the arm support portion 12 to rotate in a horizontal plane. The turn base 11 and the arm support portion 12 are coupled to each other through a speed reducer 18a, and the arm support portion 12 is so formed as to be relatively rotated (turned) in the horizontal plane with respect to the turn base 11 by a servomotor (not shown). Thus, an S-axis joint relatively rotating the turn base 11 and the arm support portion 12 about the S-axis (turn axis) is formed.

The arm support portion 12 is set on the turn base 11, and so formed as to support the whole arm of the robot 1 including the lower arm 13 and the upper arm 14. The arm support portion 12 rotatably supports the lower arm 13 through a speed reducer 18b at a lower arm mounting portion 121 extending upward. The lower arm mounting portion 121 and the lower arm 13 are opposed to each other horizontally, and so coupled to each other as to be relatively rotatable about a rotation axis (L-axis) extending horizontally. The lower arm 13 is so drivingly turned as to incline forward or rearward in a vertical plane with respect to the lower arm mounting portion 121 (arm support portion 12) by a servomotor (not shown) connected to the speed reducer 18b. Thus, an L-axis joint relatively rotating the arm support portion 12 and the lower arm 13 about the L-axis (lower arm axis) is formed.

The lower arm 13 supports the upper arm 14 in a turnable manner at an upper end portion whereas the same is supported in an anteroposteriorly turnable manner by the arm support portion 12 at a lower end portion. The lower arm 13 is so coupled to a first upper arm portion 141 of the upper arm 14 through a speed reducer 18c as to be opposed to the first upper arm portion 141 horizontally at the upper end portion. The upper arm 14 is drivingly turned vertically in the vertical plane with respect to the lower arm 13 by a servomotor (not shown) connected to the speed reducer 18c. Thus, a U-axis joint relatively rotating the lower arm 13 and the upper arm 14 about the U-axis (upper arm axis) is formed.

The upper arm 14 supports the wrist joint 15 at a second upper arm portion 142 on a first end (forward end) whereas the same is supported in a vertically turnable manner by the lower arm 13 at the first upper arm portion 141 on a second end (base portion). The first upper arm portion 141 is coupled to the second upper arm portion 142 through a speed reducer 18d, and supports the second upper arm portion 142 so as to allow the second upper arm portion 142 to rotate about a coupling axis (R-axis). The second upper arm portion 142 is drivingly rotated by a servomotor (not shown) connected to the speed reducer 18d. Thus, an R-axis joint relatively rotating the first upper arm portion 141 and the second upper arm portion 142 about the R-axis (second upper arm rotation axis) is formed. The second upper arm portion 142 is an example of the "arm".

The wrist joint 15 is provided on the forward end of the upper arm 14 (second upper arm portion 142). The wrist joint 15 is provided with the arm end 16. The wrist joint 15 is so formed as to be capable of rotating the hand 17 mounted to the arm end 16 about the B-axis (wrist bending axis) with respect to the second upper arm portion 142. The wrist joint 15 is also so formed as to be capable of rotating the hand 17 about the T-axis (arm end rotation axis) orthogonal to the B-axis with respect to the second upper arm portion 142. The detailed structure of the wrist joint 15 will be described later. The wrist joint 15 is an example of the "joint", and the B-axis is an example of the "first axis".

The robot 1 is connected to a robot control apparatus 2 through a robot instruction cable 10. The robot control apparatus 2 is so formed as to control a plurality of servomotors driving each joint of the robot 1 to cause the robot 1 to perform prescribed operations. The robot control apparatus 2 is an example of the "control apparatus".

Next, the structure of the wrist joint 15 is described in detail with reference to FIGS. 2 to 6.

Figure 2:
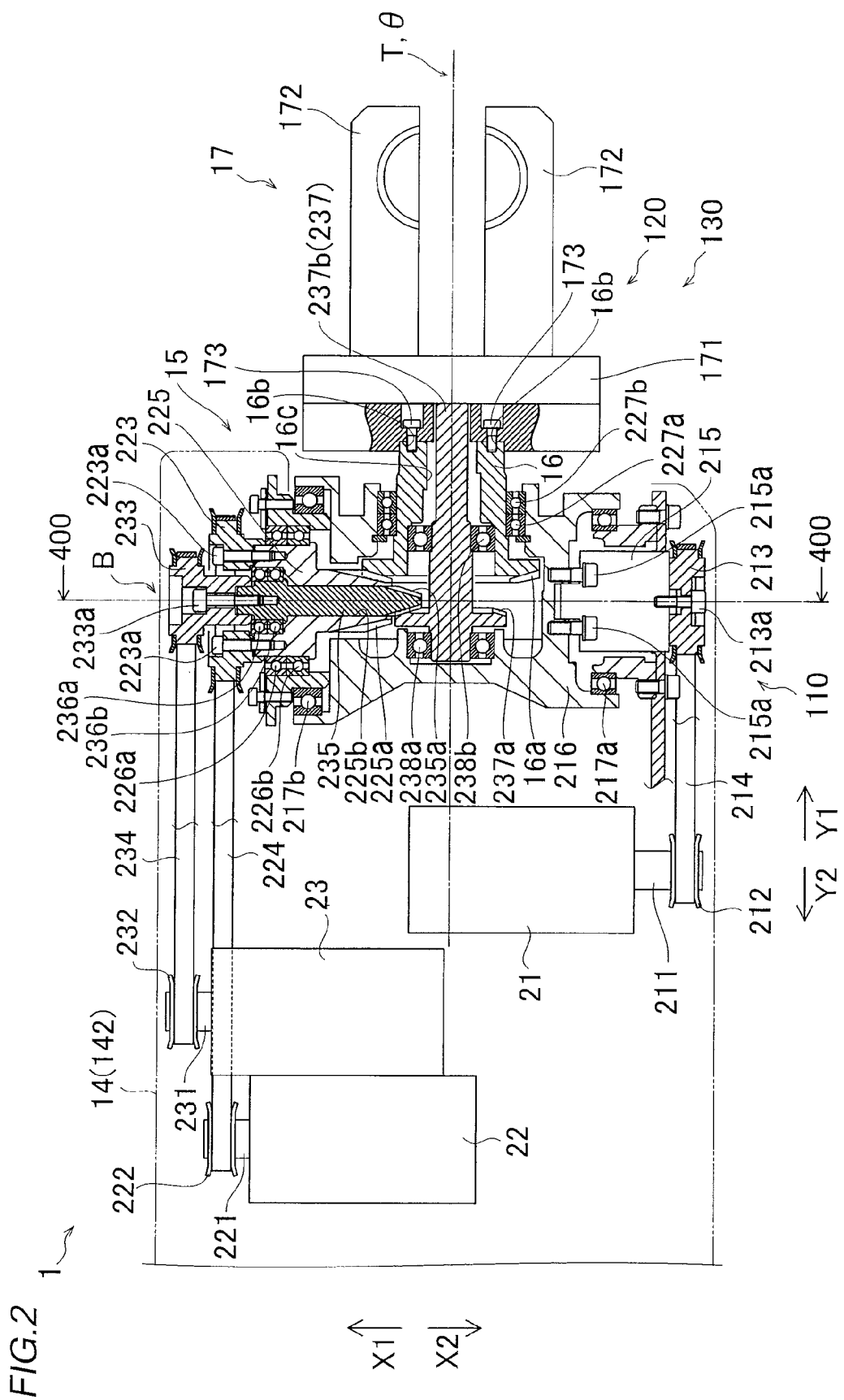
FIG. 2 is a partial sectional view showing a wrist joint of the robot according to the first embodiment.
Figure 3:
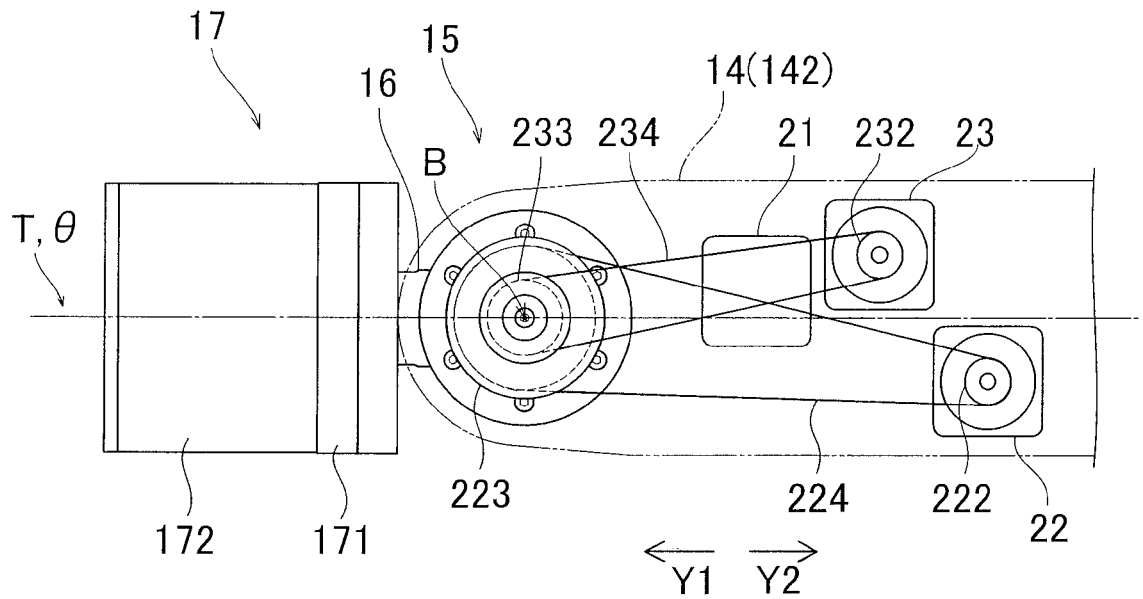
FIG. 3 is a side elevational view of the wrist joint of the robot according to the first embodiment as viewed from an X1 side in FIG. 2.
Figure 4:
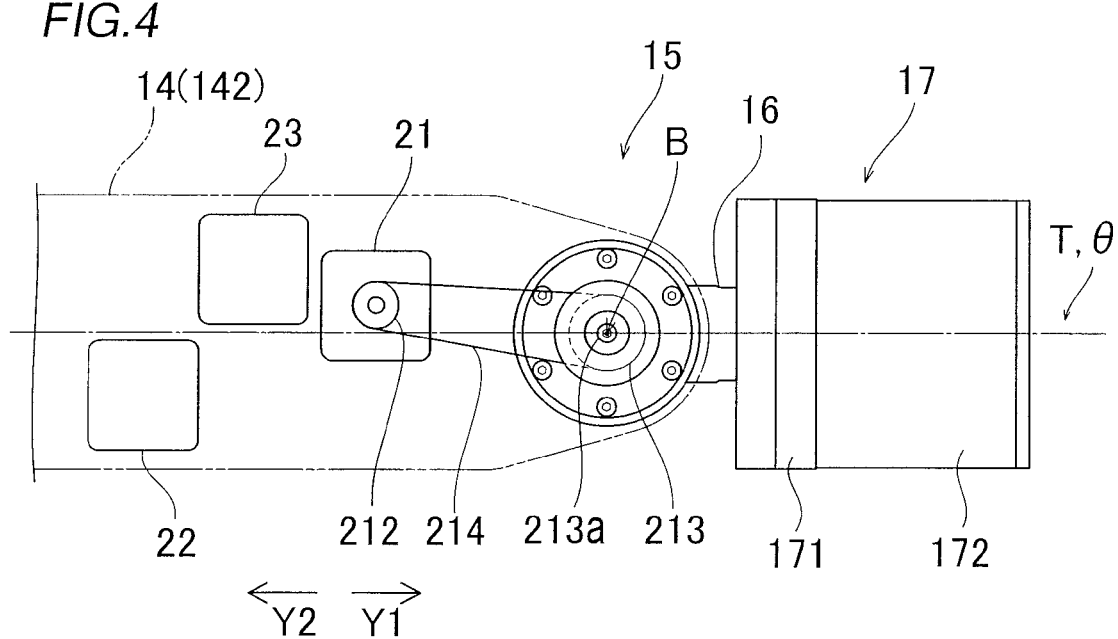
FIG. 4 is a side elevational view of the wrist joint of the robot according to the first embodiment as viewed from an X2 side in FIG. 2.

As shown in FIGS. 2 to 4, a B-axis motor 21 rotating the hand 17 mounted to the arm end 16 about the B-axis and a T-axis motor 22 rotating the hand 17 about the T-axis are provided inside the second upper arm portion 142. A θ-axis motor 23 to cause the hand 17 to perform a gripping operation is also provided inside the second upper arm portion 142. The B-axis motor 21, the T-axis motor 22, and the θ-axis motor 23 are arranged on the rear side (Y2 side) with respect to the wrist joint 15 in the second upper arm portion 142. Furthermore, the B-axis motor 21, the T-axis motor 22, and the θ-axis motor 23 each include a servomotor, and are so formed that driving thereof is controlled by the robot control apparatus 2. The B-axis motor 21 is an example of the "driving source".

(B-Axis Rotation Mechanism Portion)

Figure 5:
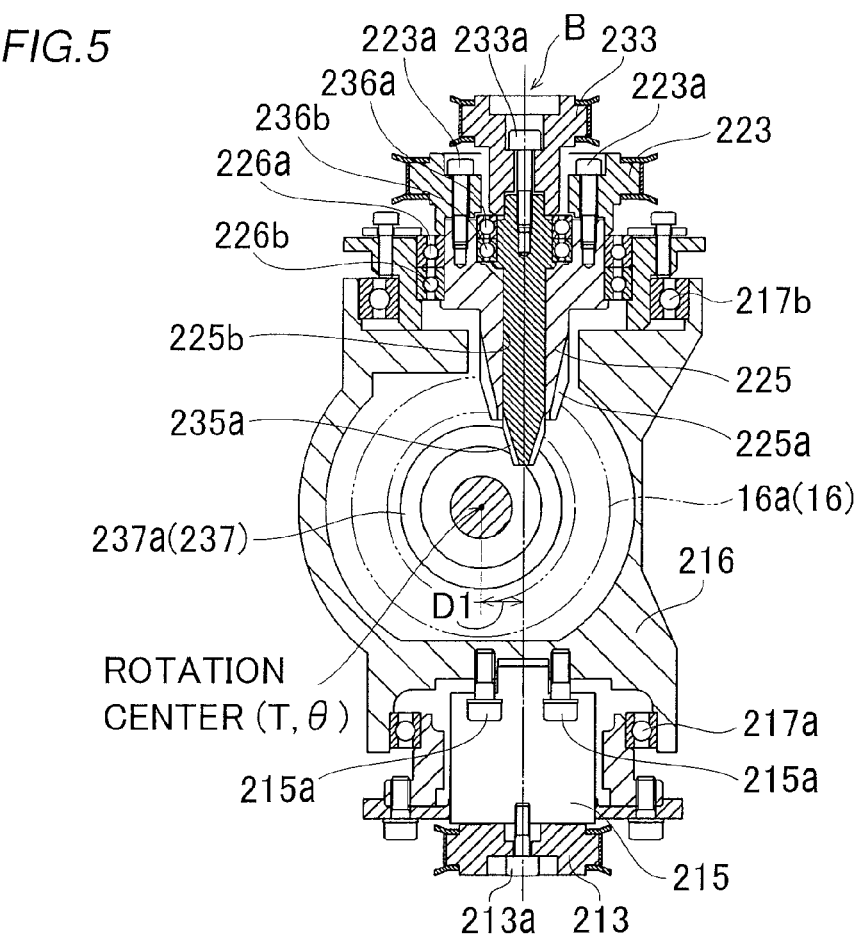
FIG. 5 is a sectional view taken along the line 400-400 in FIG. 2.

A pulley 212 is mounted on an output shaft 211 of the B-axis motor 21, as shown in FIG. 2. As shown in FIGS. 2 and 4, a transmission belt 214 circularly formed is wound on the pulley 212 and a pulley 213 rotating about the B-axis as a rotation axis. The pulley 213 is coupled to an input shaft (not shown) of a speed reducer 215 with a screw member 213a, as shown in FIGS. 2 and 5. An output shaft (not shown) of the speed reducer 215 is coupled to a B-axis rotation portion 216 with screw members 215a. Thus, the driving force of the B-axis motor 21 is transmitted to the B-axis rotation portion 216 while the transmission speed thereof is reduced by the speed reducer 215. Annular bearings 217a and 217b are provided on respective ends of the B-axis rotation portion 216 in the extensional direction of the B-axis. The B-axis rotation portion 216 is supported by the bearings 217a and 217b to be rotatable about the B-axis (as a rotation axis) with respect to the second upper arm portion 142. Due to this structure, the B-axis rotation portion 216 is rotated about the B-axis (as a rotation axis) with respect to the second upper arm portion 142 by the driving force of the B-axis motor 21. A B-axis rotation mechanism portion 110 is constituted mainly by the speed reducer 215 and the B-axis rotation portion 216, as described above. The B-axis rotation mechanism portion 110 is an example of the "third rotation mechanism portion", and the B-axis rotation portion 216 is an example of the "first axis rotation portion". The speed reducer 215 is an example of the "speed reduction mechanism portion".

(T-Axis Rotation Mechanism Portion)

A pulley 222 is mounted on an output shaft 221 of the T-axis motor 22, as shown in FIG. 2. As shown in FIGS. 2 and 3, a transmission belt 224 circularly formed is wound on the pulley 222 and a pulley 223 rotating about the B-axis as a rotation axis. The pulley 223 is coupled to a T-axis drive gear portion 225 with screw members 223a, as shown in FIGS. 2 and 5. The T-axis drive gear portion 225 is arranged along the B-axis outside a θ-axis drive gear portion 235 described later, and supported by annular bearings 226a and 226b to be rotatable about the B-axis (as a rotation axis) with respect to the second upper arm portion 142. Due to this structure, the T-axis drive gear portion 225 is rotated about the B-axis (as a rotation axis) with respect to the second upper arm portion 142 by the driving force of the T-axis motor 22. The T-axis drive gear portion 225 is an example of the "first drive gear portion".

Figure 6:
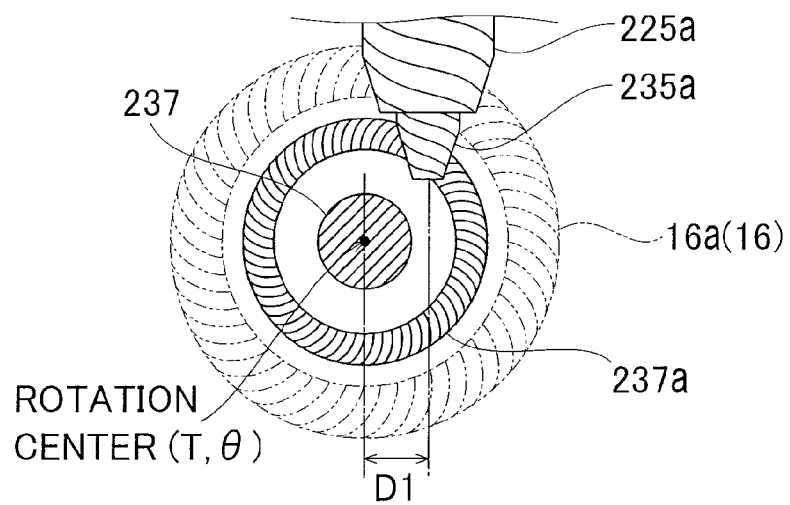
FIG. 6 is a diagram for illustrating the structure of a T-axis rotation mechanism and a θ-axis rotation mechanism of the robot according to the first embodiment.
Figure 7:
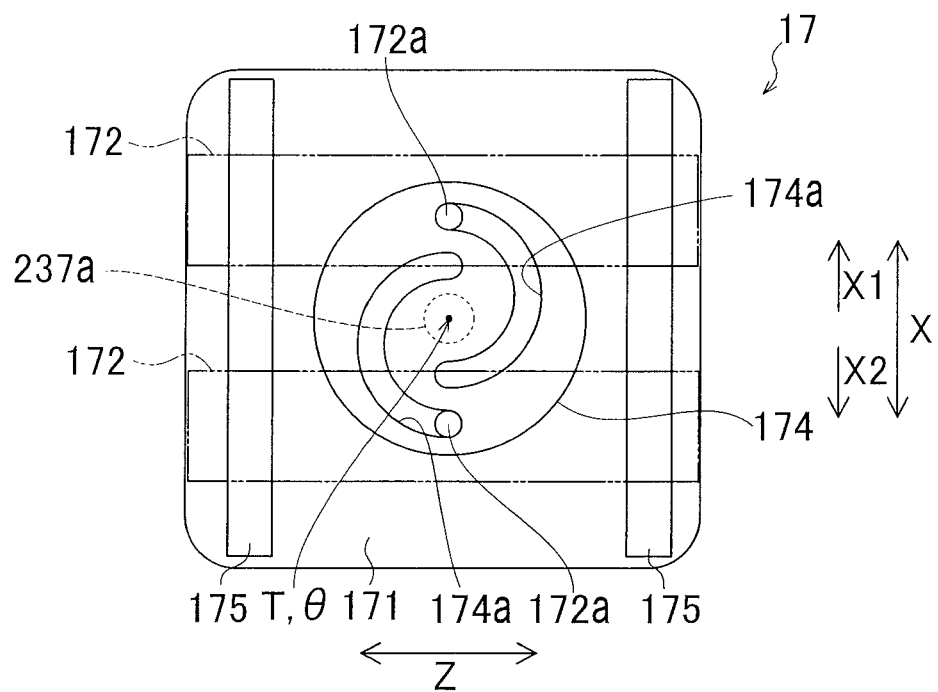
FIG. 7 is a front elevational view showing a hand of the robot according to the first embodiment.

According to the first embodiment, a substantially conical tooth portion 225a is formed on a point of the T-axis drive gear portion 225. The tooth portion 225a is so formed as to mesh (engage) with a substantially conical tooth portion 16a formed on an end portion of the arm end 16 opposite to the side mounted with the hand 17 (on the Y2 side in FIG. 2). Specifically, the tooth portion 225a of the T-axis drive gear portion 225 is a pinion gear having a diameter smaller than that of the tooth portion 16a of the arm end 16, and the tooth portion 16a of the arm end 16 is a hypoid gear (registered trademark) of a spiral bevel gear. As shown in FIG. 6, the tooth portion 225a of the T-axis drive gear portion 225 has a spiral tooth form, and the tooth portion 16a of the arm end 16 has a curved tooth form. Thus, slippage in a tooth trace direction (extensional direction of teeth) occurs between the tooth portion 225a and the tooth portion 16a to smoothly mesh the tooth portion 225a and the tooth portion 16a with each other. The tooth portion 225a of the T-axis drive gear portion 225 is formed to have a smaller number of teeth than the tooth portion 16a of the arm end 16 in order to obtain a prescribed reduction ratio (reduction ratio of 1/3, for example). The arm end 16 is an example of the "first driven gear portion".

As shown in FIG. 5, the rotation axis (B-axis) of the tooth portion 225a of the T-axis drive gear portion 225 is arranged at a position offset by a distance D1 in a direction orthogonal to the B-axis from the rotation center (T-axis) of the tooth portion 16a of the arm end 16, as viewed from the axial direction of the T-axis. In other words, the rotation axis (B-axis) of the tooth portion 225a of the T-axis drive gear portion 225 and the rotation axis (T-axis) of the tooth portion 16a of the arm end 16 are separated from each other by the distance D1 in the direction orthogonal to the B-axis, as viewed from the axial direction of the T-axis. Furthermore, the tooth portion 225a of the T-axis drive gear portion 225 and the tooth portion 16a of the arm end 16 are meshed with each other on the B-axis offset by the distance D1 from the rotation center (T-axis) of the tooth portion 16a. As shown in FIG. 2, the tooth portion 225a of the T-axis drive gear portion 225 is so formed as to mesh with the tooth portion 16a of the arm end 16 on the forward end side (Y1 side) of the robot 1 with respect to the rotation axis (B-axis). The T-axis drive gear portion 225 has a through-hole 225b penetrating in the extensional direction of the B-axis, and is formed in a hollow shape.

The arm end 16 is arranged along the T-axis orthogonal to the B-axis outside a θ-axis driven gear portion 237 described later, and supported by annular bearings 227a and 227b to be rotatable about the T-axis (as a rotation axis) with respect to the B-axis rotation portion 216, as shown in FIG. 2. Due to this structure, the T-axis motor 22 rotates the T-axis drive gear portion 225 about the B-axis to rotate the arm end 16 about the T-axis. Screw holes 16b to mount the hand 17 are provided in the forward end of the arm end 16. The arm end 16 has a through-hole 16c penetrating in the extensional direction of the T-axis, and is formed in a hollow shape. A T-axis rotation mechanism portion 120 is constituted mainly by the T-axis drive gear portion 225 and the arm end 16, as described above. The T-axis rotation mechanism portion 120 is an example of the "first rotation mechanism portion".

(θ-Axis Rotation Mechanism Portion)

A pulley 232 is mounted on an output shaft 231 of the θ-axis motor 23, as shown in FIG. 2. As shown in FIGS. 2 and 3, a transmission belt 234 circularly formed is wound on the pulley 232 and a pulley 233 rotating about the B-axis as a rotation axis. The pulley 233 is coupled to the θ-axis drive gear portion 235 with a screw member 233a, as shown in FIGS. 2 and 5. The θ-axis drive gear portion 235 is arranged along the B-axis inside the through-hole 225b of the T-axis drive gear portion 225. Furthermore, the θ-axis drive gear portion 235 is supported by annular bearings 236a and 236b to be rotatable about the B-axis (as a rotation axis) with respect to the T-axis drive gear portion 225. Due to this structure, the θ-axis drive gear portion 235 is rotated about the B-axis (as a rotation axis) with respect to the T-axis drive gear portion 225 by the driving force of the θ-axis motor 23. The θ-axis drive gear portion 235 is an example of the "second drive gear portion".

According to the first embodiment, a substantially conical tooth portion 235a is formed on a point of the θ-axis drive gear portion 235. The tooth portion 235a is so formed as to mesh (engage) with a substantially conical tooth portion 237a formed on the θ-axis driven gear portion 237. Specifically, the tooth portion 235a of the θ-axis drive gear portion 235 is a pinion gear having a diameter smaller than that of the tooth portion 237a of the θ-axis driven gear portion 237, and the tooth portion 237a of the θ-axis driven gear portion 237 is a hypoid gear (registered trademark) of a spiral bevel gear. As shown in FIG. 6, the tooth portion 235a of the θ-axis drive gear portion 235 has a spiral tooth form, and the tooth portion 237a of the θ-axis driven gear portion 237 has a curved tooth form. Thus, slippage in a tooth trace direction (extensional direction of teeth) occurs between the tooth portion 235a and the tooth portion 237a to smoothly mesh the tooth portion 235a and the tooth portion 237a with each other. The tooth portion 235a of the θ-axis drive gear portion 235 is formed to have a smaller number of teeth than the tooth portion 237a of the θ-axis driven gear portion 237 in order to obtain a high reduction ratio (reduction ratio of 1/10, for example). According to the first embodiment, the tooth portion 235a of the θ-axis drive gear portion 235 is a pinion gear while the tooth portion 237a of the θ-axis driven gear portion 237 is a hypoid gear (registered trademark), whereby the gear ratio between the tooth portion 235a and the tooth portion 237a can be easily rendered large so that a high reduction ratio can be easily obtained. The tooth portion 235a of the θ-axis drive gear portion 235 and the tooth portion 237a of the θ-axis driven gear portion 237 have a reduction ratio larger than that of the tooth portion 225a of the T-axis drive gear portion 225 and the tooth portion 16a of the arm end 16. Furthermore, the ratio of the diameter of the tooth portion 225a of the T-axis drive gear portion 225 to the diameter of the tooth portion 235a of the θ-axis drive gear portion 235 is different in value from the ratio of the diameter of the tooth portion 16a of the arm end 16 to the diameter of the tooth portion 237a of the θ-axis driven gear portion 237, and larger than the ratio of the diameter of the tooth portion 16a to the diameter of the tooth portion 237a. The θ-axis driven gear portion 237 is an example of the "second driven gear portion".

The rotation axis (B-axis) of the tooth portion 235a of the θ-axis drive gear portion 235 is arranged at a position offset by the distance D1 in the direction orthogonal to the B-axis from the rotation center (θ-axis) of the tooth portion 237a of the θ-axis driven gear portion 237, as viewed from the axial direction of the θ-axis, as shown in FIG. 5. In other words, the rotation axis (B-axis) of the tooth portion 235a of the θ-axis drive gear portion 235 and the rotation axis (θ-axis) of the tooth portion 237a of the θ-axis driven gear portion 237 are separated from each other by the distance D1 in the direction orthogonal to the B-axis, as viewed from the axial direction of the θ-axis. Furthermore, the tooth portion 235a of the θ-axis drive gear portion 235 and the tooth portion 237a of the θ-axis driven gear portion 237 are meshed with each other on the B-axis offset by the distance D1 from the rotation center (θ-axis) of the tooth portion 237a. As shown in FIGS. 2 and 5, the rotation axis (T-axis) of the tooth portion 16a of the arm end 16 and the rotation axis (θ-axis) of the tooth portion 237a of the θ-axis driven gear portion 237 are coaxially located. Therefore, as shown in FIG. 5, the tooth portion 235a of the θ-axis drive gear portion 235 and the tooth portion 225a of the T-axis drive gear portion 225 are meshed with the tooth portion 237a of the θ-axis driven gear portion 237 and the tooth portion 16a of the arm end 16, respectively, at positions separated by the same distance D1 in the direction orthogonal to the B-axis from the T-axis (θ-axis), as viewed from the axial direction of the T-axis (θ-axis). The tooth portion 237a of the θ-axis driven gear portion 237 and the tooth portion 16a of the arm end 16 are opposed to each other through the B-axis, as shown in FIG. 2. The tooth portion 235a of the θ-axis drive gear portion 235 is so formed as to mesh with the tooth portion 237a of the θ-axis driven gear portion 237 on a side (Y2 side in FIG. 2) opposite to the forward end side of the robot 1 with respect to the rotation axis (B-axis). The θ-axis and the T-axis are examples of the "second axis".

As shown in FIG. 2, the θ-axis driven gear portion 237 is arranged along the θ-axis inside the through-hole 16c of the arm end 16. The θ-axis driven gear portion 237 is supported by annular bearings 238a and 238b to be rotatable about the θ-axis (as a rotation axis) with respect to the arm end 16 and the B-axis rotation portion 216. Due to this structure, the θ-axis motor 23 rotates the θ-axis drive gear portion 235 about the B-axis to rotate the θ-axis driven gear portion 237 about the θ-axis. The θ-axis rotation mechanism portion 130 is constituted mainly by the θ-axis drive gear portion 235 and the θ-axis driven gear portion 237, as described above. The θ-axis rotation mechanism portion 130 is an example of the "second rotation mechanism portion". The θ-axis driven gear portion 237 has a connection portion 237b connected to the hand 17 in an end portion on the side provided with the hand 17 (Y1 side in FIG. 2). The connection portion 237b is exposed from the wrist joint 15 through the through-hole 16c of the arm end 16 when the hand 17 is not mounted.

Due to the aforementioned structure, the B-axis motor 21 is so driven that the B-axis rotation portion 216 is rotated about the B-axis, followed by rotation of the arm end 16 and the θ-axis driven gear portion 237 about the B-axis. In other words, the B-axis rotation portion 216 is rotated about the B-axis to rotate the T-axis and the θ-axis about the B-axis. Thus, the hand 17 mounted to the arm end 16 is rotated about the B-axis by the driving force of the B-axis motor 21. The T-axis motor 22 is so driven that the T-axis drive gear portion 225 is rotated about the B-axis, followed by rotation of the arm end 16 about the T-axis. Thus, the hand 17 mounted to the arm end 16 is rotated about the T-axis by the driving force of the T-axis motor 22. The θ-axis motor 23 is so driven that the θ-axis drive gear portion 235 is rotated about the B-axis, followed by rotation of the θ-axis driven gear portion 237 about the θ-axis. Thus, the driving force of the θ-axis motor 23 is transmitted to the hand 17 through the connection portion 237b. The B-axis rotation mechanism portion 110, the T-axis rotation mechanism portion 120, and the θ-axis rotation mechanism portion 130 can operate independently of each other.

The hand 17 has a base portion 171 and a pair of finger portions 172, as shown in FIGS. 2 to 4 and 7. The base portion 171 is fixedly attached to the forward end of the arm end 16 with screw members 173, as shown in FIG. 2. The base portion 171 is formed in a substantially rectangular shape as viewed from the axial direction of the T-axis (θ-axis). The base portion 171 is provided with a rotation portion 174 in a circular shape as viewed from the axial direction of the T-axis (θ-axis). The rotation portion 174 is connected to the connection portion 237b of the θ-axis driven gear portion 237, and so formed as to rotate about the θ-axis with respect to the base portion 171 following rotation of the connection portion 237b about the θ-axis. The rotation portion 174 is provided with a pair of slits 174a formed arcuately as viewed from the axial direction of the T-axis (θ-axis). The pair of slits 174a are arranged to deviate in a radial direction from each other. Specifically, the center of one of the arcuate slits 174a deviates in a direction X1 in FIG. 7 from the θ-axis, and the center of the other of the arcuate slits 174a deviates in a direction X2 in FIG. 7 from the θ-axis.

The pair of finger portions 172 are provided on a surface side (Y1 side in FIGS. 2 to 4) of the base portion 171. Furthermore, the pair of finger portions 172 are opposed to each other. The pair of finger portions 172 are formed to be movable in directions in which the finger portions 172 are opposed to each other (direction X in FIG. 7). Specifically, the pair of finger portions 172 are mounted across a pair of rails 175 extending in the direction X, and formed to be movable in the direction X along the pair of rails 175. The pair of finger portions 172 each are provided with a pin 172a protruding toward the base portion 171. The pin 172a of one of the finger portions 172 is inserted into one of the slits 174a, and the pin 172a of the other of the finger portions 172 is inserted into the other of the slits 174a. The rotation portion 174 so rotates that the pin 172a moves in the direction X along the corresponding slit 174a. Thus, the pair of finger portions 172 are moved in directions in which the finger portions 172 approach each other or in directions in which the finger portions 172 separate from each other. In other words, the gripping operation of the hand 17 is performed. Due to this structure, the driving force of the θ-axis motor 23 is transmitted to the hand 17 through the θ-axis rotation mechanism portion 130 as power to perform a gripping operation.

According to the first embodiment, as hereinabove described, the θ-axis drive gear portion 235 is arranged inside the T-axis drive gear portion 225 while the θ-axis driven gear portion 237 is arranged inside the arm end 16, whereby the arm end 16 and the θ-axis driven gear portion 237 can be arranged in a small space as compared with a case where the arm end 16 and the θ-axis driven gear portion 237 are adjacently arranged at an interval from each other while the T-axis drive gear portion 225 and the θ-axis drive gear portion 235 can be arranged in a small space as compared with a case where the T-axis drive gear portion 225 and the θ-axis drive gear portion 235 are adjacently arranged at an interval from each other. Thus, spaces for arranging both the driven gear portions (arm end 16 and θ-axis driven gear portion 237) and the drive gear portions (T-axis drive gear portion 225 and θ-axis drive gear portion 235) can be reduced to miniaturize the wrist joint 15. Furthermore, as shown in FIG. 5, the B-axis about which the T-axis drive gear portion 225 and the θ-axis drive gear portion 235 rotate is arranged at the position offset by the distance D1 from the rotation centers of the arm end 16 and the θ-axis driven gear portion 237, as viewed from the axial direction of the T-axis (θ-axis), whereby the tooth portion 225a of the T-axis drive gear portion 225 and the tooth portion 235a of the θ-axis drive gear portion 235 can be spirally formed to be meshed with the tooth portion 16a of the arm end 16 and the tooth portion 237a of the θ-axis driven gear portion 237 dissimilarly to a case where the B-axis about which the T-axis drive gear portion 225 and the θ-axis drive gear portion 235 rotate is arranged on the rotation centers of the arm end 16 and the θ-axis driven gear portion 237 as viewed from the axial direction of the T-axis (θ-axis) (a case where bevel gears are employed, for example). Therefore, slippage in the tooth trace direction (extensional direction of teeth) occurs at a meshing position of the tooth portion 225a and the tooth portion 16a and a meshing position of the tooth portion 235a and the tooth portion 237a so that the drive gear portions and the driven gear portions can be smoothly rotated. Thus, the wrist joint 15 of the robot 1 can smoothly operate.

According to the first embodiment, as hereinabove described, the T-axis rotation mechanism portion 120 and the θ-axis rotation mechanism portion 130 each have a deceleration function. According to this structure, torque transmitted from the T-axis motor 22 is increased by the T-axis rotation mechanism portion 120 so that the hand 17 can be rotated about the T-axis by the increased large torque, and torque transmitted from the θ-axis motor 23 is increased by the θ-axis rotation mechanism portion 130 so that the increased large torque can be transmitted to the hand 17 as driving force for a gripping operation.

According to the first embodiment, as hereinabove described, the tooth portion 225a of the T-axis drive gear portion 225 is formed to have a smaller number of teeth than the tooth portion 16a of the arm end 16 while the tooth portion 235a of the θ-axis drive gear portion 235 is formed to have a smaller number of teeth than the tooth portion 237a of the θ-axis driven gear portion 237. According to this structure, the T-axis rotation mechanism portion 120 and the θ-axis rotation mechanism portion 130 each having a deceleration function can be easily obtained.

According to the first embodiment, as hereinabove described, the tooth portion 225a of the T-axis drive gear portion 225 and the tooth portion 235a of the θ-axis drive gear portion 235 are pinion gears, and the tooth portion 225a of the T-axis drive gear portion 225 and the tooth portion 235a of the θ-axis drive gear portion 235 each have a spiral tooth form. According to this structure, high deceleration can be easily achieved with the pinion gears while due to the spiral tooth form, slippage in the tooth trace direction (extensional direction of teeth) occurs at the meshing position of the tooth portion 225a and the tooth portion 16a and the meshing position of the tooth portion 235a and the tooth portion 237a so that the drive gear portions (T-axis drive gear portion 225 and θ-axis drive gear portion 235) and the driven gear portions (arm end 16 and θ-axis driven gear portion 237) can be smoothly rotated.

According to the first embodiment, as hereinabove described, the T-axis rotation mechanism portion 120 and the θ-axis rotation mechanism portion 130 are so formed that the ratio of the diameter of the tooth portion 225a of the T-axis drive gear portion 225 to the diameter of the tooth portion 235a of the θ-axis drive gear portion 235 is different in value from the ratio of the diameter of the tooth portion 16a of the arm end 16 to the diameter of the tooth portion 237a of the θ-axis driven gear portion 237. According to this structure, as shown in FIG. 5, the tooth portion 225a of the T-axis drive gear portion 225 and the tooth portion 235a of the θ-axis drive gear portion 235 can be meshed with the tooth portion 16a of the arm end 16 and the tooth portion 237a of the θ-axis driven gear portion 237, respectively, at the positions offset from the rotation centers of the arm end 16 and the θ-axis driven gear portion 237, as viewed from the axial direction of the T-axis (θ-axis).

According to the first embodiment, as hereinabove described, the tooth portion 16a of the arm end 16 and the tooth portion 237a of the θ-axis driven gear portion 237 are opposed to each other through the B-axis. According to this structure, the tooth portion 16a of the arm end 16 and the tooth portion 237a of the θ-axis driven gear portion 237 can be arranged in a balanced manner in a space near the B-axis, dissimilarly to a case where both the tooth portion 16a of the arm end 16 and the tooth portion 237a of the θ-axis driven gear portion 237 are arranged on one side with respect to the B-axis, and hence the space near the B-axis can be efficiently utilized. Consequently, the wrist joint 15 can be further miniaturized.

Furthermore, according to the first embodiment, no driving source (motor) driving the hand 17 may be provided in the hand 17, and hence the hand 17 serving as an end effector can be miniaturized. Thus, work can be performed with the hand 17 in a narrower place.

According to the first embodiment, as hereinabove described, the robot 1 is provided with the B-axis rotation mechanism portion 110 rotating the arm end 16 of the T-axis rotation mechanism portion 120 and the θ-axis driven gear portion 237 of the θ-axis rotation mechanism portion 130 about the B-axis to rotate the hand 17 (T-axis and θ-axis) about the B-axis. According to this structure, the hand 17 can be moved about the two axes of the B-axis and the T-axis by the B-axis rotation mechanism portion 110 and the T-axis rotation mechanism portion 120 while driving force to perform a gripping operation can be transmitted to the hand 17 by the θ-axis rotation mechanism portion 130.

According to the first embodiment, as hereinabove described, the connection portion 237b of the θ-axis driven gear portion 237 is formed to be exposed from the wrist joint 15 when the hand 17 is not mounted. According to this structure, the connection portion 237b can be easily connected to the hand 17, and hence workability for mounting the hand 17 can be inhibited from reduction even if the θ-axis driven gear portion 237 is provided in the wrist joint 15.

According to the first embodiment, as hereinabove described, the B-axis is arranged to be orthogonal to the θ-axis and the T-axis. According to this structure, rotational force about the B-axis can be converted into rotational force about the θ-axis orthogonal to the B-axis and rotational force about the T-axis orthogonal to the B-axis to be transmitted by the θ-axis rotation mechanism portion 130 and the T-axis rotation mechanism portion 120, respectively.

According to the first embodiment, as hereinabove described, the arm end 16 of the T-axis rotation mechanism portion 120 and the θ-axis driven gear portion 237 of the θ-axis rotation mechanism portion 130 are bevel gears (hypoid gears (registered trademark)) capable of meshing with the T-axis drive gear portion 225 and the θ-axis drive gear portion 235, respectively, that are pinion gears. According to this structure, the rotational force of the T-axis drive gear portion 225 rotating about the B-axis and the rotational force of the θ-axis drive gear portion 235 rotating about the B-axis can be easily converted into rotational force about the T-axis and rotational force about the θ-axis, respectively, by the pinion gears and the bevel gears (hypoid gears (registered trademark)).

According to the first embodiment, as hereinabove described, the B-axis rotation mechanism portion 110 is provided with B-axis rotation portion 216 rotating about the B-axis to rotate the arm end 16 of the T-axis rotation mechanism portion 120 and the θ-axis driven gear portion 237 of the θ-axis rotation mechanism portion 130 about the B-axis and the speed reducer 215 reducing the transmission speed of driving force transmitted from the B-axis motor 21 and transmitting the driving force to the B-axis rotation portion 216. According to this structure, the B-axis rotation portion 216 can be rotated about the B-axis while the transmission speed of the driving force of the B-axis motor 21 is reduced by the speed reducer 215, and hence both torque rotating the arm end 16 of the T-axis rotation mechanism portion 120 about the B-axis and torque rotating the θ-axis driven gear portion 237 of the θ-axis rotation mechanism portion 130 about the B-axis can be easily increased.

Second Embodiment

A second embodiment is now described with reference to FIGS. 1 and 8. According to this second embodiment, a robot 201 includes no end effector, dissimilarly to the aforementioned first embodiment in which the robot 1 includes the hand 17. In the second embodiment, portions similar to those in the aforementioned first embodiment are denoted by the same reference numerals, to omit redundant description.

Figure 8:
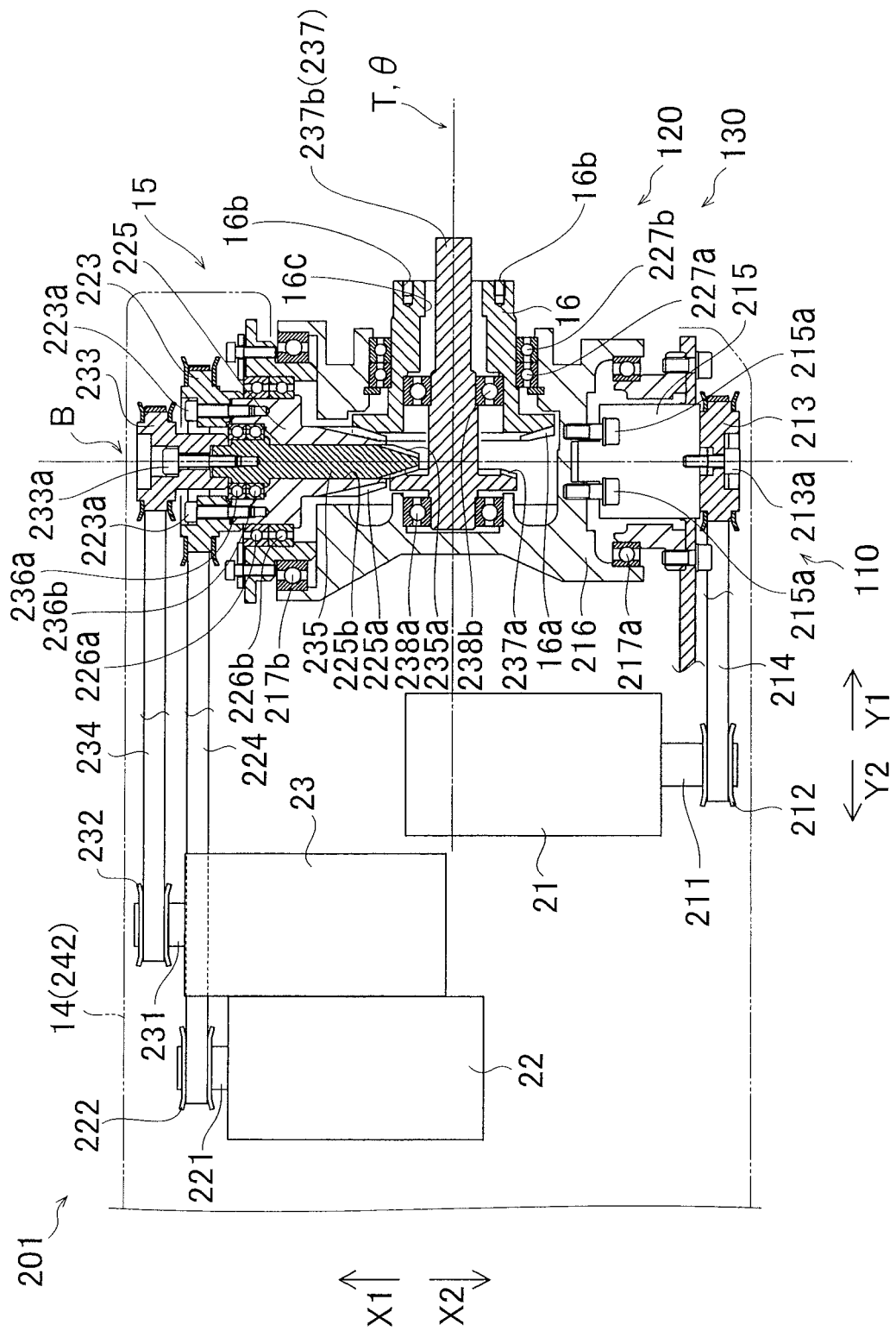
FIG. 8 is a partial sectional view showing a wrist joint of the robot according to the second embodiment.

As shown in FIG. 8, the robot 201 according to the second embodiment includes no end effector, and is so formed that an end effector as an external component is mountable thereon. A B-axis motor 21 rotating the end effector as an external component mounted to an arm end 16 about a B-axis and a T-axis motor 22 rotating the end effector about a T-axis are provided inside a second upper arm portion 242, similarly to the aforementioned first embodiment. A θ-axis motor 23 to operate the end effector is further provided inside the second upper arm portion 242. The second upper arm portion 242 is an example of the "arm".

A T-axis rotation mechanism portion 120 and a θ-axis rotation mechanism portion 130 according to the second embodiment are similar in structure to the T-axis rotation mechanism portion 120 and the θ-axis rotation mechanism portion 130 according to the aforementioned first embodiment. In other words, the T-axis drive gear portion 225 is formed to be rotated about the B-axis (as a rotation axis) with respect to the second upper arm portion 242 by the driving force of the T-axis motor 22. The rotation axis (B-axis) of a tooth portion 225a of the T-axis drive gear portion 225 is arranged at a position offset by a distance D1 in a direction orthogonal to the B-axis from the rotation center (T-axis) of a tooth portion 16a of the arm end 16, as viewed from the axial direction of the T-axis. The T-axis motor 22 rotates the T-axis drive gear portion 225 about the B-axis to rotate the arm end 16 about the T-axis. A θ-axis drive gear portion 235 is arranged along the B-axis inside a through-hole 225b of the T-axis drive gear portion 225. The θ-axis drive gear portion 235 is formed to be rotated about the B-axis (as a rotation axis) with respect to the T-axis drive gear portion 225 by the driving force of the θ-axis motor 23. The rotation axis (B-axis) of a tooth portion 235a of the θ-axis drive gear portion 235 is arranged at a position offset by the distance D1 in the direction orthogonal to the B-axis from the rotation center (θ-axis) of a tooth portion 237a of a θ-axis driven gear portion 237, as viewed from the axial direction of the θ-axis. The rotation axis (T-axis) of the tooth portion 16a of the arm end 16 and the rotation axis (θ-axis) of the tooth portion 237a of the θ-axis driven gear portion 237 are coaxially located. The θ-axis driven gear portion 237 is arranged along the θ-axis inside a through-hole 16c of the arm end 16, as shown in FIG. 2. The θ-axis motor 23 rotates the θ-axis drive gear portion 235 about the B-axis to rotate the θ-axis driven gear portion 237 about the θ-axis.

The remaining structure of the robot 201 according to the second embodiment is similar to that of the robot 1 according to the aforementioned first embodiment, as shown in FIGS. 1 and 8. In other words, the robot 1 according to the aforementioned first embodiment from which the hand 17 has been detached is the robot 201 according to the second embodiment. Therefore, the robot 201 according to the second embodiment is a six-axis (S-axis, L-axis, U-axis, R-axis, B-axis, and T-axis) vertical articulated robot, includes no end effector, and includes a turn base 11, an arm support portion 12, a lower arm 13, an upper arm 14, a wrist joint 15, and the arm end 16.

According to the second embodiment, as hereinabove described, the θ-axis drive gear portion 235 is arranged inside the T-axis drive gear portion 225 while the θ-axis driven gear portion 237 is arranged inside the arm end 16, whereby spaces for arranging both the driven gear portions (arm end 16 and θ-axis driven gear portion 237) and the drive gear portions (T-axis drive gear portion 225 and θ-axis drive gear portion 235) can be reduced to miniaturize the wrist joint 15, similarly to the aforementioned first embodiment. Furthermore, the B-axis about which the T-axis drive gear portion 225 and the θ-axis drive gear portion 235 rotate is arranged at the position offset by the distance D1 from the rotation centers of the arm end 16 and the θ-axis driven gear portion 237, as viewed from the axial direction of the T-axis (θ-axis), whereby slippage in a tooth trace direction (extensional direction of teeth) occurs at a meshing position of the tooth portion 225a and the tooth portion 16a and a meshing position of the tooth portion 235a and the tooth portion 237a so that the drive gear portions and the driven gear portions can be smoothly rotated.

The remaining effects of the second embodiment are similar to those of the aforementioned first embodiment.

Third Embodiment

A third embodiment is now described with reference to FIGS. 9 and 10. According to this third embodiment, a T-axis drive gear portion 335 is arranged inside a through-hole 325b of a θ-axis drive gear portion 325 (the θ-axis drive gear portion 325 is arranged outside the T-axis drive gear portion 335), dissimilarly to the aforementioned first embodiment in which the θ-axis drive gear portion 235 is arranged inside the through-hole 225b of the T-axis drive gear portion 225. In the third embodiment, portions similar to those in the aforementioned first embodiment are denoted by the same reference numerals, to omit redundant description.

(θ-Axis Rotation Mechanism Portion)

A pulley 323 is formed to be rotatable by a θ-axis motor (not shown). The pulley 323 is coupled to the θ-axis drive gear portion 325 with screw members 323a, as shown in FIG. 9. The θ-axis drive gear portion 325 is arranged along a B-axis outside the T-axis drive gear portion 335, and supported by annular bearings (not shown) to be rotatable about the B-axis (as a rotation axis) with respect to a second upper arm portion 142 (see FIG. 2). Due to this structure, the θ-axis drive gear portion 325 is rotated about the B-axis (as a rotation axis) with respect to the second upper arm portion 142 by the driving force of the θ-axis motor (not shown). The B-axis is an example of the "first axis", and the θ-axis drive gear portion 325 is an example of the "second drive gear portion".

According to the third embodiment, a substantially conical tooth portion 325a is formed on a point of the θ-axis drive gear portion 325. The tooth portion 325a is so formed as to mesh (engage) with a substantially conical tooth portion 337a formed on a θ-axis driven gear portion 337 described later. Specifically, the tooth portion 325a of the θ-axis drive gear portion 325 is a pinion gear having a diameter smaller than that of the tooth portion 337a of the θ-axis driven gear portion 337, and the tooth portion 337a of the θ-axis driven gear portion 337 is a hypoid gear (registered trademark) of a spiral bevel gear. The tooth portion 325a of the θ-axis drive gear portion 325 has a spiral tooth form, and the tooth portion 337a of the θ-axis driven gear portion 337 has a curved tooth form. Thus, slippage in a tooth trace direction (extensional direction of teeth) occurs between the tooth portion 325a and the tooth portion 337a to smoothly mesh the tooth portion 325a and the tooth portion 337a with each other. The tooth portion 325a of the θ-axis drive gear portion 325 is formed to have a smaller number of teeth than the tooth portion 337a of the θ-axis driven gear portion 337 in order to obtain a prescribed reduction ratio (reduction ratio of 1/3, for example). The θ-axis driven gear portion 337 is an example of the "second driven gear portion".

Figure 9:
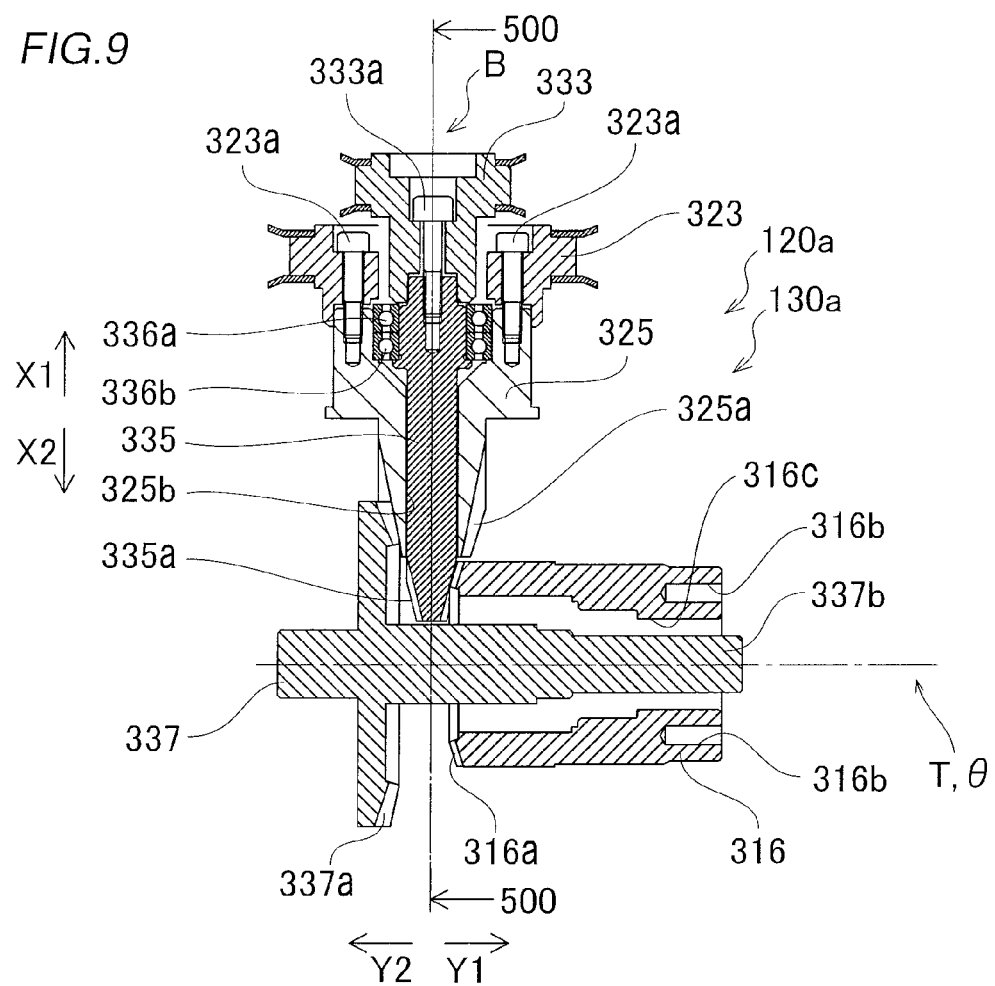
FIG. 9 is a partial sectional view showing a T-axis rotation mechanism and a θ-axis rotation mechanism of a robot according to a third embodiment.
Figure 10:
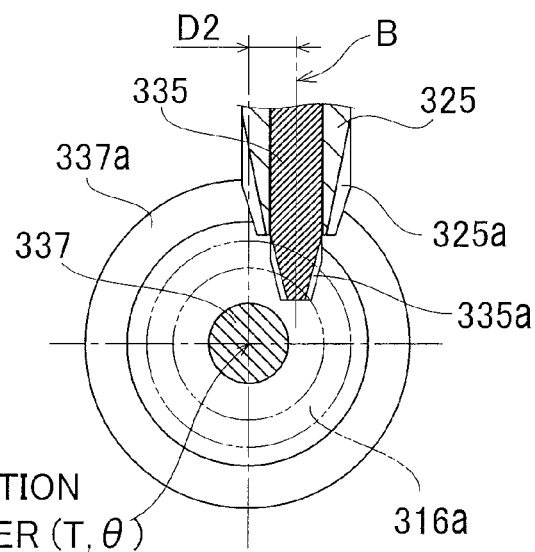
FIG. 10 is a sectional view taken along the line 500-500 in FIG. 9.

As shown in FIG. 10, the rotation axis (B-axis) of the tooth portion 325a of the θ-axis drive gear portion 325 is arranged at a position offset by a distance D2 in a direction orthogonal to the B-axis from the rotation center (θ-axis) of the tooth portion 337a of the θ-axis driven gear portion 337, as viewed from the axial direction of the θ-axis. In other words, the rotation axis (B-axis) of the tooth portion 325a of the θ-axis drive gear portion 325 and the rotation axis (θ-axis) of the tooth portion 337a of the θ-axis driven gear portion 337 are separated from each other by the distance D2 in the direction orthogonal to the B-axis, as viewed from the axial direction of the θ-axis. Furthermore, the tooth portion 325a of the θ-axis drive gear portion 325 and the tooth portion 337a of the θ-axis driven gear portion 337 are meshed with each other on the B-axis offset by the distance D2 from the rotation center (θ-axis) of the tooth portion 337a. As shown in FIG. 9, the tooth portion 325a of the θ-axis drive gear portion 325 is so formed as to mesh with the tooth portion 337a of the θ-axis driven gear portion 337 on a side (Y2 side) opposite to the forward end side of a robot 1 with respect to the rotation axis (B-axis). The θ-axis drive gear portion 325 has the through-hole 325b penetrating in the extensional direction of the B-axis, and is formed in a hollow shape.

The θ-axis driven gear portion 337 is arranged along the θ-axis inside a through-hole 316c of an arm end 316 described later, as shown in FIG. 9. Furthermore, the θ-axis driven gear portion 337 is supported by annular bearings (not shown) to be rotatable about the θ-axis (as a rotation axis) with respect to the arm end 316. Due to this structure, the θ-axis motor (not shown) rotates the θ-axis drive gear portion 325 about the B-axis to rotate the θ-axis driven gear portion 337 about the θ-axis. A θ-axis rotation mechanism portion 130a is constituted mainly by the θ-axis drive gear portion 325 and the θ-axis driven gear portion 337, as described above. The θ-axis rotation mechanism portion 130a is an example of the "second rotation mechanism portion". The θ-axis driven gear portion 337 has a connection portion 337b connected to a hand 17 in an end portion on the side provided with the hand 17 (Y1 side). The connection portion 337b is exposed from a wrist joint 15 through the through-hole 316c of the arm end 316 described later when the hand 17 is not mounted.

(T-Axis Rotation Mechanism Portion)

A pulley 333 is formed to be rotatable by a T-axis motor (not shown). The pulley 333 is coupled to the T-axis drive gear portion 335 with a screw member 333a, as shown in FIG. 9. The T-axis drive gear portion 335 is arranged along the B-axis inside the through-hole 325b of the θ-axis drive gear portion 325, and supported by annular bearings 336a and 336b to be rotatable about the B-axis (as a rotation axis) with respect to the θ-axis drive gear portion 325. Due to this structure, the T-axis drive gear portion 335 is rotated about the B-axis (as a rotation axis) with respect to the θ-axis drive gear portion 325 by the driving force of the T-axis motor (not shown). The T-axis drive gear portion 335 is an example of the "first drive gear portion".

According to the third embodiment, a substantially conical tooth portion 335a is formed on a point of the T-axis drive gear portion 335. The tooth portion 335a is so formed as to mesh (engage) with a substantially conical tooth portion 316a formed on an end portion of the arm end 316 opposite to the side mounted with the hand 17 (on the Y2 side). Specifically, the tooth portion 335a of the T-axis drive gear portion 335 is a pinion gear having a diameter smaller than that of the tooth portion 316a of the arm end 316, and the tooth portion 316a of the arm end 316 is a hypoid gear (registered trademark) of a spiral bevel gear. The tooth portion 335a of the T-axis drive gear portion 335 has a spiral tooth form, and the tooth portion 316a of the arm end 316 has a curved tooth form. Thus, slippage in a tooth trace direction (extensional direction of teeth) occurs between the tooth portion 335a and the tooth portion 316a to smoothly mesh the tooth portion 335a and the tooth portion 316a with each other. The tooth portion 335a of the T-axis drive gear portion 335 is formed to have a smaller number of teeth than the tooth portion 316a of the arm end 316 in order to obtain a high reduction ratio (reduction ratio of 1/15, for example). The tooth portion 335a of the T-axis drive gear portion 335 and the tooth portion 316a of the arm end 316 have a reduction ratio larger than that of the tooth portion 325a of the θ-axis drive gear portion 325 and the tooth portion 337a of the θ-axis driven gear portion 337. Furthermore, the ratio of the diameter of the tooth portion 325a of the θ-axis drive gear portion 325 to the diameter of the tooth portion 335a of the T-axis drive gear portion 335 is different in value from the ratio of the diameter of the tooth portion 337a of the θ-axis driven gear portion 337 to the diameter of the tooth portion 316a of the arm end 316, and larger than the ratio of the diameter of the tooth portion 337a to the diameter of the tooth portion 316a. The arm end 316 is an example of the "first driven gear portion".

As shown in FIG. 10, the rotation axis (B-axis) of the tooth portion 335a of the T-axis drive gear portion 335 is arranged at a position offset by the distance D2 in the direction orthogonal to the B-axis from the rotation center (T-axis) of the tooth portion 316a of the arm end 316, as viewed from the axial direction of the T-axis. In other words, the rotation axis (B-axis) of the tooth portion 335a of the T-axis drive gear portion 335 and the rotation axis (T-axis) of the tooth portion 316a of the arm end 316 are separated from each other by the distance D2 in the direction orthogonal to the B-axis, as viewed from the axial direction of the T-axis. Furthermore, the tooth portion 335a of the T-axis drive gear portion 335 and the tooth portion 316a of the arm end 316 are meshed with each other on the B-axis offset by the distance D2 from the rotation center (T-axis) of the tooth portion 316a. As shown in FIGS. 9 and 10, the rotation axis (T-axis) of the tooth portion 316a of the arm end 316 and the rotation axis (θ-axis) of the tooth portion 337a of the θ-axis driven gear portion 337 are coaxially located. Therefore, as shown in FIG. 10, the tooth portion 335a of the T-axis drive gear portion 335 and the tooth portion 325a of the θ-axis drive gear portion 325 are meshed with the tooth portion 337a of the θ-axis driven gear portion 337 and the tooth portion 316a of the arm end 316, respectively, at positions separated by the same distance D2 in the direction orthogonal to the B-axis from the T-axis (θ-axis), as viewed from the axial direction of the T-axis (θ-axis). The tooth portion 337a of the θ-axis driven gear portion 337 and the tooth portion 316a of the arm end 316 are opposed to each other through the B-axis, as shown in FIG. 9. The tooth portion 335a of the T-axis drive gear portion 335 is so formed as to mesh with the tooth portion 316a of the arm end 316 on the forward end side (Y1 side) of the robot 1 with respect to the rotation axis (B-axis). The θ-axis and the T-axis are examples of the "second axis".

The arm end 316 is arranged along the T-axis orthogonal to the B-axis outside the θ-axis driven gear portion 337, as shown in FIG. 9, and supported by annular bearings (not shown) to be rotatable about the T-axis (as a rotation axis) with respect to a B-axis rotation portion 216 (see FIG. 2). Due to this structure, the T-axis motor (not shown) rotates the T-axis drive gear portion 335 about the B-axis to rotate the arm end 316 about the T-axis. Screw holes 316b to mount the hand 17 (see FIG. 2) are provided in the forward end of the arm end 316. The arm end 316 has the through-hole 316c penetrating in the extensional direction of the T-axis, and is formed in a hollow shape. A T-axis rotation mechanism portion 120a is constituted mainly by the T-axis drive gear portion 335 and the arm end 316, as described above. The T-axis rotation mechanism portion 120a is an example of the "first rotation mechanism portion".

Due to the aforementioned structure, the θ-axis motor (not shown) is so driven that the θ-axis drive gear portion 325 is rotated about the B-axis, followed by rotation of the θ-axis driven gear portion 337 about the θ-axis. Thus, the driving force of the θ-axis motor is transmitted to the hand 17 through the connection portion 337b. The T-axis motor (not shown) is so driven that the T-axis drive gear portion 335 is rotated about the B-axis, followed by rotation of the arm end 316 about the T-axis. Thus, the hand 17 mounted to the arm end 316 is rotated about the T-axis by the driving force of the T-axis motor. The T-axis rotation mechanism portion 120a and the θ-axis rotation mechanism portion 130a can operate independently of each other.

The remaining structure of the robot according to the third embodiment is similar to that of the robot according to the aforementioned first embodiment.

According to the third embodiment, as hereinabove described, the T-axis drive gear portion 335 is arranged inside the θ-axis drive gear portion 325 while the θ-axis driven gear portion 337 is arranged inside the arm end 316, whereby spaces for arranging both the driven gear portions (arm end 316 and θ-axis driven gear portion 337) and the drive gear portions (T-axis drive gear portion 335 and θ-axis drive gear portion 325) can be reduced to miniaturize the wrist joint 15, similarly to the aforementioned first embodiment. Furthermore, the B-axis about which the T-axis drive gear portion 335 and the θ-axis drive gear portion 325 rotate is arranged at the position offset by the distance D2 from the rotation centers of the arm end 316 and the θ-axis driven gear portion 337, as viewed from the axial direction of the T-axis (θ-axis), whereby slippage in the tooth trace direction (extensional direction of teeth) occurs at a meshing position of the tooth portion 325a and the tooth portion 337a and a meshing position of the tooth portion 335a and the tooth portion 316a so that the drive gear portions and the driven gear portions can be smoothly rotated.

The remaining effects of the third embodiment are similar to those of the aforementioned first embodiment.

For example, while the vertical articulated robot is shown as an example of the robot in each of the aforementioned embodiments, it can be applied to a robot other than the vertical articulated robot.

While the hand performing a gripping operation is shown as an example of the end effector in each of the aforementioned embodiments, the present invention is not restricted to this. For example, an end effector such as a welding torch or a polishing tool, other than the hand may alternatively be employed.

While the drive apparatus is applied to the robot in each of the aforementioned embodiments, the present invention is not restricted to this. The drive apparatus can alternatively be applied to a machine tool, an apparatus for inspecting a substrate, etc. other than the robot, for example.

While the wrist joint capable of operating about the two axes of the B-axis and the T-axis is shown as an example of the joint in each of the aforementioned embodiments, the present invention is not restricted to this. A joint operating about a single axis may alternatively be employed, or a joint operating about more than two axes may alternatively be employed.

While the θ-axis driven gear portion serving as the second driven gear portion is arranged inside the arm end serving as the first driven gear portion in each of the aforementioned embodiments, the present invention is not restricted to this. The first driven gear portion may alternatively be arranged inside the second driven gear portion (the second driven gear portion may alternatively be arranged outside the first driven gear portion).

What is claimed is:

1. A drive apparatus comprising:
   a first rotation mechanism portion including a first drive gear potion rotating axis and a first driven gear portion rotated about a second axis by the first drive gear portion, the second axis intersecting with the first axis when viewed from a direction orthogonal to the first axis and the second axis, and
   a second rotation mechanism portion including a second drive gear portion rotating about the first axis, arranged inside or outside the first drive gear portion and a second driven gear portion meshing with the second drive gear portion, rotated about the second axis by the second drive gear portion, arranged inside or outside the first driven gear portion; and
   a third rotation mechanism portion rotating the first driven gear portion of the first rotation mechanism portion and the second driven gear portion of the second rotation mechanism portion about the first axis to rotate the end effector about the first axis,
   wherein the first drive gear portion is formed to have a smaller number of teeth than the first driven gear portion, and the second drive gear portion is formed to have a smaller number of teeth than the second driven gear portion.

2. The drive apparatus according to claim 1, wherein the first axis is arranged at a position offset by a prescribed distance from rotation centers of the first driven gear portion and the second driven a gear portion, as viewed from an axial direction of the second axis.

3. The drive apparatus according to claim 1, wherein a meshing position of the first drive gear portion and the first driven gear portion and a meshing position of the second drive gear portion and the second driven gear portion are located on the first axis, as viewed from the axial direction of the second axis.

4. The drive apparatus according to claim 1, wherein the first drive gear portion is formed to have a smaller number of teeth than the first driven gear portion, and the second drive gear portion is formed to have a smaller number of teeth than the second driven gear portion.

5. The drive apparatus according to claim 1, wherein the first axis and the second axis are orthogonal to each other.

6. The drive apparatus according to claim 1, wherein the first rotation mechanism portion and the second rotation mechanism portion are so formed tidal a ratio of a diameter of a tooth portion of the first drive gear portion to a diameter of a tooth portion of the second drive gear portion is different in value from a ratio of a diameter of a tooth portion of the first driven gear portion to a diameter of a tooth portion of the second driven gear portion.

7. The drive apparatus according to claim 1, wherein the first driven gear portion and a meshing portion of the second driven gear portion are opposed to each other through the first axis when viewed from the direction orthogonal to the first axis and the second axis.

8. The drive apparatus according to claim 1, wherein the third rotation mechanism portion includes a first axis rotation portion rotating about the first axis to rotate the first driven gear portion of the first rotation mechanism portion and the second driven gear portion of the second rotation mechanism portion about the first axis and a speed reduction mechanism portion reducing a transmission speed of driving force transmitted from a driving source and transmitting the driving force to the first axis rotation portion.

9. The drive apparatus according to claim 1, wherein the first drive gear portion comprises a pinion gear capable of meshing with the first driven gear portion and has a spiral tooth form, and the second drive gear portion comprises a pinion gear capable of meshing with the second drive a gear portion and has a spiral tooth form.

10. The drive apparatus according to claim 9, wherein the first driven gear portion comprises a bevel gear capable of meshing with the first drive gear portion comprising a pinion gear, and the second driven gear portion comprises a bevel gear capable of meshing with the second drive gear portion comprising a pinion gear.

11. A robot comprising:
   an arm; and
   a joint provided on one end portion of the arm, wherein the joint has:
   a first rotation mechanism portion including a first drive gear potion rotating axis and a first driven gear portion rotated about a second axis by the first drive gear portion, the second axis intersecting with the first axis when viewed from a direction orthogonal to the first axis and the second axis, and a second rotation mechanism portion including a second drive gear portion rotating about the first axis, arranged inside or outside the first drive gear portion and a second driven gear portion meshing with the second drive gear portion, rotated about the second axis by the second drive gear portion, arranged inside or outside the first driven gear portion; and a third rotation mechanism portion rotating the first driven gear portion of the first rotation mechanism portion and the second driven gear portion of the second rotation mechanism portion about the first axis to rotate the end effector about the first axis, wherein the first drive gear portion is formed to have a smaller number of teeth than the first driven gear portion, and the second drive gear portion is formed to have a smaller number of teeth than the second driven gear portion.

12. The robot according to claim 11, further comprising:
a base fixed to a mounting surface;
a support member rotatably coupled to the base,
a lower arm portion rotatably coupled to the support member; and
an upper arm portion rotatably coupled to the lower arm portion, wherein
the arm is rotatably coupled to the upper arm portion.

13. The robot according to claim 11, wherein
the first axis is arranged at a position offset by a prescribed distance from rotation centers of the first driven gear portion and the second driven gear portion, as viewed from an axial direction of the second axis.

14. The robot according to claim 11, wherein
either one of the first rotation mechanism portion and the second rotation mechanism portion is so formed as to rotate an end effector mounted to the arm through the joint about the second axis, and
the other one of the first rotation mechanism portion and the second rotation mechanism portion is so formed as to transmit driving force to operate the end effector.

15. The robot according to claim 14, wherein
the other one of the first rotation mechanism portion and the second rotation mechanism portion transmitting the driving force to operate the end effector is so provided that at least a portion thereof connected to the end effector is exposed from the joint.

16. The robot according to claim 11, wherein
the first drive gear portion comprises a pinion gear capable of meshing with the first driven gear portion and has a spiral tooth form, and the second drive near portion comprises a pinion gear capable of meshing with the second driven gear portion and has a spiral tooth form.

17. The robot according to claim 11, wherein
a meshing position of the first drive gear portion and the first driven gear portion and a meshing position of the second drive gear portion and the second driven gear portion are located on the first axis, as viewed from an axial direction of the second axis.

* * * * *